(12) United States Patent
Kimba Dit Adamou et al.

(10) Patent No.: US 11,778,526 B2
(45) Date of Patent: Oct. 3, 2023

(54) METHOD FOR DETERMINING NETWORKING MODE SUPPORTED BY CELL AND DEVICE

(71) Applicant: VIVO MOBILE COMMUNICATION CO., LTD., Chang'an Dongguan (CN)

(72) Inventors: Boubacar Kimba Dit Adamou, Chang'an Dongguan (CN); Xiaodong Yang, Chang'an Dongguan (CN); Wei Bao, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 443 days.

(21) Appl. No.: 17/168,853

(22) Filed: Feb. 5, 2021

(65) Prior Publication Data

US 2021/0160745 A1 May 27, 2021

Related U.S. Application Data

(63) Continuation of application No. PCT/CN2019/099341, filed on Aug. 6, 2019.

(30) Foreign Application Priority Data

Aug. 7, 2018 (CN) .......................... 201810893419.2

(51) Int. Cl.
*H04W 24/10* (2009.01)
*H04W 36/00* (2009.01)
(52) U.S. Cl.
CPC ....... *H04W 36/0079* (2018.08); *H04W 24/10* (2013.01); *H04W 36/0061* (2013.01)

(58) Field of Classification Search
CPC ............. H04W 36/0079; H04W 24/10; H04W 36/0061; H04W 36/0058; H04W 4/06; H04W 16/18; Y02D 30/70
See application file for complete search history.

(56) References Cited

U.S. PATENT DOCUMENTS

2014/0079022 A1 3/2014 Wang et al.
2016/0345119 A1 11/2016 Futaki
(Continued)

FOREIGN PATENT DOCUMENTS

CN 10233819 A 12/2012
CN 102833819 A 12/2012
(Continued)

OTHER PUBLICATIONS

Written Opinion for related International Application No. PCT/CN2019/099341; report dated Feb. 18, 2021.
(Continued)

*Primary Examiner* — Chuong A Ngo
(74) *Attorney, Agent, or Firm* — von Briesen & Roper, s.c.

(57) ABSTRACT

A method for determining a networking mode supported by a cell and a device are provided. The method includes: receiving a measurement report of a target cell, where the measurement report includes: SIB1-related information and/or first indication information, and the first indication information is used to indicate a networking mode supported by the target cell; and determining, according to the SIB1-related information and/or the first indication information, the networking mode supported by the target cell.

20 Claims, 6 Drawing Sheets

(56) References Cited

U.S. PATENT DOCUMENTS

| | | |
|---|---|---|
| 2017/0006520 A1 | 1/2017 | Quan et al. |
| 2017/0164135 A1* | 6/2017 | Kodaypak ............... H04W 4/70 |
| 2018/0368080 A1 | 12/2018 | Chae et al. |
| 2019/0261236 A1 | 8/2019 | Wang et al. |
| 2019/0349905 A1* | 11/2019 | Matsuda ............... H04W 72/23 |
| 2019/0357095 A1* | 11/2019 | Pakniat ............ H04W 36/0094 |

FOREIGN PATENT DOCUMENTS

| | | |
|---|---|---|
| CN | 108024299 A | 5/2018 |
| JP | 2015534355 A | 11/2015 |
| WO | 2015114695 A1 | 8/2015 |
| WO | 2016209056 A1 | 12/2016 |
| WO | 2017194212 A1 | 11/2017 |

OTHER PUBLICATIONS

Office Action for related Chinese Application No. 201810893419.2; report dated Nov. 4, 2020.

Office Action for related Chinese Application No. 2018108934192. 2; report dated Apr. 12, 2021.

3GPP TSG-RAN WG2 AH 1807, NSA/SA NR cell indication in EUTRAN CGI reporting, Ericsson, R2-1809680, Montreal, Canada, Jul. 2-6, 2018, pp. 1-6.

3GPP TSG-RAN WG2 AH 1807, NSA/SA NR cell indication in NR CGI reporting, Ericsson, R2-1809682, Montreal, Canada, Jul. 2-6, 2018, pp. 1-4.

R2-1802692; ANR for NR, 3GPP TSG-RAN2#101; Discussion and Decision; Athens, Greece; Feb. 26-Mar. 2, 2018.

R3-184142; Further Discussions on ANR for SA and NSA; 3GPP TSG-RAN WG3 NR AH 1807 Meeting; Discussions & Approval; Montreal, Canada; Jul. 2, 2018.

R2-1811773; NR cell type indication; 3GPP TSG RAN WG2 Meeting #103; Discussion and Decision; Gothenburg, Sweden, Aug. 20-24, 2018.

Extended European Search Report dated Sep. 9, 2021, in related application PCT/CN2019/099341, filed Aug. 6, 2019.

Office Action for related Chinese Application No. 201810893419.2; report dated Apr. 12, 2021.

Japanese Notice of Reasons for Refusal for related Application No. 2021-506421; reported dated Mar. 22, 2022.

* cited by examiner

METHOD FOR DETERMINING NETWORKING MODE SUPPORTED BY CELL AND DEVICE

CROSS REFERENCE TO RELATED APPLICATIONS

This application is continuation application of PCT International Application No. PCT/CN2019/099341 filed on Aug. 6, 2019, which claims priority to Chinese Patent Application No. 201810893419.2, filed on Aug. 7, 2018 in China, the disclosures of which are incorporated in their entireties by reference herein.

TECHNICAL FIELD

Embodiments of the present disclosure relate to the field of communications technologies, and specifically, to a method for determining a networking mode supported by a cell and a device.

BACKGROUND

In a fifth-generation mobile communications technology (fifth-generation, 5G) new radio (New Radio, NR), in a deployment scenario of a heterogeneous system of long time evolution (Long Time Evolution, LTE) or evolved long term evolution (Evolved Long Term Evolution, eLTE) and NR, an LTE or eLTE base station may configure a measurement report for a terminal device to measure an NR cell. According to deployment of the NR cell, networking mode supported by the NR cell include:

(1) Non-Standalone (Non-Standalone, NSA) Networking:

The NR cell is not connected to a 5G core network: the NR cell cannot deploy a network in a standalone manner.

The cell is only used for an evolved universal terrestrial radio access (Evolved Universal Terrestrial Radio Access, E-UTRA)-NR dual connection (EN-DC), or a next generation radio access network (Next Generation Radio Access Networks, NG-RAN) E-UTRA-NR dual connection (NGEN-DC), for example, an LTE-NR or eLTE-NR dual connection, where an LTE or eLTE base station is a primary node and an NR base station is a secondary node. In cell system information, a system information block 1 (System Information Block 1, SIB 1) may not be broadcasted in the NSA cell.

(2) Standalone (Standalone, SA) Networking:

NR is connected to a 5G core network: the NR cell can deploy a network in a standalone manner, namely, standalone (Standalone, SA) networking. In cell system information, a SIB1 must be broadcasted in an SA cell.

(3) SA+NSA (SA+NSA)

The networking mode supported by the NR cell may be SA+NSA (SA+NSA). In cell system information, a SIB1 must be broadcasted in an SA+NSA cell.

Therefore, when a terminal device reports a measurement report of the NR cell, if the LTE or eLTE base station does not read the SIB1 of the NR cell from the measurement report of the NR cell that is reported by the terminal device, the LTE or eLTE base station knows that the NR cell is only an NSA cell. The LTE or eLTE base station knows that only a dual connection interface can be established with the NR cell.

However, when the terminal device reports the measurement report of the NR cell, if the measurement report of the NR cell that is reported by the terminal device includes the SIB1 information of the NR cell, the LTE or eLTE base station cannot determine whether the NR cell supports NSA, SA, or SA+NSA. As a result, the LTE or eLTE base station cannot determine a neighbor relationship to be established with the NR cell.

SUMMARY

Embodiments of the present disclosure provide a method for determining a networking mode supported by a cell and a device, to resolve the problem of how to determine the networking mode supported by the cell.

According to a first aspect, a method for determining a networking mode supported by a cell is provided, where the method is applied to a network device and includes:

receiving a measurement report of a target cell, where the measurement report includes: SIB1-related information and/or first indication information, and the first indication information is used to indicate a networking mode supported by the target cell; and determining, according to the SIB1-related information and/or the first indication information, the networking mode supported by the target cell.

According to a second aspect, a method for determining a networking mode supported by a cell is further provided, where the method is applied to a terminal device and includes:

sending a measurement report of a target cell to a network device, where the measurement report includes: SIB1-related information and/or first indication information, so that the network device determines, according to the SIB1-related information and/or the first indication information, a networking mode supported by the target cell, where the first indication information is used to indicate the networking mode supported by the target cell.

According to a third aspect, a method for determining a networking mode supported by a cell is further provided, where the method is applied to a network device and includes:

when receiving SIB1-related information sent by a terminal device, sending a connection setup request to a target cell; and when connection setup of the network device and the target cell fails, determining that the target cell supports standalone networking; or receiving, from the target cell, a first message responding to the connection setup request, where the first message includes second indication information, and the second indication information is used to indicate a networking mode supported by the target cell; and determining, according to the second indication information, the networking mode supported by the target cell.

According to a fourth aspect, a method for determining a networking mode supported by a cell is further provided, where the method is applied to a terminal device and includes:

sending SIB1-related information of a target cell to a network device, so that the network device sends a connection setup request to the target cell; and when connection setup of the network device and the target cell fails, the network device determines that the target cell supports standalone networking;

or sending SIB1-related information of a target cell to a network device, so that the network device sends a connection setup request to the target cell, the network device receives, from the target cell, a first message responding to the connection setup request, where the first message includes second indication information, and the second indication information is used to indicate a networking mode supported by the target cell; and the network device determines, according to the second indication information, the networking mode supported by the target cell.

According to a fifth aspect, a network device is further provided, including:

a third receiving module, configured to receive a measurement report of a target cell, where the measurement report includes: SIB1-related information and/or first indication information, and the first indication information is used to indicate a networking mode supported by the target cell; and a second determining module, configured to determine, according to the SIB1-related information and/or the first indication information, the networking mode supported by the target cell.

According to a sixth aspect, a terminal device is further provided, including:

a third sending module, configured to send a measurement report of a target cell to a network device, where the measurement report includes: SIB1-related information and/or first indication information, so that the network device determines, according to the SIB1-related information and/or the first indication information, a networking mode supported by the target cell, where the first indication information is used to indicate the networking mode supported by the target cell.

According to a seventh aspect, a network device is further provided, including:

a fourth sending module, configured to: when receiving SIB1-related information sent by a terminal device, send a connection setup request to a target cell; and a third determining module, configured to: when connection setup of the network device and the target cell fails, determine that the target cell supports standalone networking;

or a fourth receiving module, configured to: receive, from the target cell, a first message responding to the connection setup request, where the first message includes second indication information, and the second indication information is used to indicate a networking mode supported by the target cell; and a fourth determining module, configured to determine, according to the second indication information, the networking mode supported by the target cell.

According to an eighth aspect, a terminal device is further provided, including:

a fifth sending module, configured to send SIB1-related information of a target cell to a network device, so that the network device sends a connection setup request to the target cell; and when connection setup of the network device and the target cell fails, the network device determines that the target cell supports standalone networking;

or a sixth sending module, configured to send SIB1-related information of a target cell to a network device, so that the network device sends a connection setup request to the target cell; the network device receives, from the target cell, a first message responding to the connection setup request, where the first message includes second indication information, and the second indication information is used to indicate a networking mode supported by the target cell; and the network device determines, according to the second indication information, the networking mode supported by the target cell.

According to a ninth aspect, a network device is further provided, including: a processor, a memory, and a computer program that is stored in the memory and capable of running on the processor, where the computer program, when executed by the processor, implements steps of the method for determining a networking mode supported by a cell in the first aspect, or steps of the method for determining a networking mode supported by a cell in the third aspect.

According to a tenth aspect, a terminal device is further provided, including: a processor, a memory, and a computer program that is stored in the memory and capable of running on the processor, where the computer program, when executed by the processor, implements steps of the method for determining a networking mode supported by a cell in the second aspect, or steps of the method for determining a networking mode supported by a cell in the fourth aspect.

According to an eleventh aspect, a computer readable storage medium is further provided, where the computer readable storage medium stores a computer program, and the computer program, when executed by a processor, implements steps of the method for determining a networking mode supported by a cell in the first aspect, the second aspect, the third aspect, or the fourth aspect.

In the embodiments of the present disclosure, the networking mode supported by the cell may be determined, to help an operator better plan a neighboring cell relationship of a network.

BRIEF DESCRIPTION OF DRAWINGS

It becomes clear for a person of ordinary skill in the art to learn various other advantages and benefits by reading detailed description of the following optional implementation manners. Accompanying drawings are merely used for showing the optional implementation manners, and are not considered as a limitation on the present disclosure. In all accompanying drawings, a same reference symbol is used to indicate a same part. In the accompanying drawings.

DESCRIPTION OF EMBODIMENTS

Figure 1:
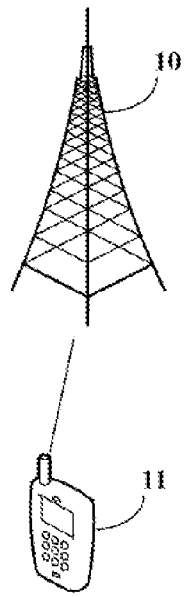
FIG. 1 is a schematic architectural diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

To better understand the embodiments of the present disclosure, the following contents are first introduced: to automatically add neighboring cells, when a serving base station receives the measurement report reported by the terminal device, if it is found that the reported measurement result includes a measurement result of an unknown cell (a physical cell identifier (Physical Cell Identifier, PCI) is unknown), the base station can select the terminal device, and then deliver a measurement configuration setup, modification, or release (RRC-CONN-RECFG) message to instruct the terminal device to measure information such as a cell global identifier (Cell Global Identifier, CGI), a tracking area code (Tracking Area Code, TAC), and a public land mobile network (Public Land Mobile Network, PLMN) of the unknown cell.

If the terminal device successfully reads information such as the CGI, the TAC, and the PLMN of the cell, the terminal device reports the information to the base station. After receiving the information such as the CGI, the TAC, and the PLMN reported by the terminal device, the base station may automatically add the cell as a neighboring cell. The function of adding a neighboring cell needs to establish an X2 interface or an Xn interface or an X2+Xn interface with the neighboring cell.

The term "include" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design solution described as "exemplary" or "example" in the embodiments of the present disclosure should not be explained as being more preferred or having more advantages than another embodiment or design solution. Specifically, the words such as "exemplary" or "for example" are used to present related concepts in a specific manner.

The technology described herein is not limited to a long time evolution (Long Time Evolution, LTE)/LTE-Advanced (LTE-Advanced, LTE-A) system, and can also be used in various wireless communications systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. The terms "system" and "network" are often used interchangeably. The CDMA system can implement radio technologies such as CDMA2000 and universal terrestrial radio access (Universal Terrestrial Radio Access, UTRA). UTRA includes wideband CDMA (Wideband Code Division Multiple Access, WCDMA) and other CDMA variants. The TDMA system can implement radio technologies such as the global system for mobile communications (Global System for Mobile Communication, GSM). The OFDMA system can implement radio technologies such as ultra mobile broadband (Ultra Mobile Broadband, UMB), evolved UTRA (Evolution-UTRA, E-UTRA), IEEE 802.11 (Wi-Fi), IEEE 802.16 (WiMAX), IEEE 802.20, and Flash-OFDM. UTRA and E-UTRA are a part of the universal mobile telecommunications system (Universal Mobile Telecommunications System, UMTS). LTE and more advanced LTE (such as LTE-A) are new UMTS versions that use E-UTRA. UTRA, E-UTRA, UMTS, LTE, LTE-A, and GSM are described in documents from the organization named "3rd generation partnership project (3rd Generation Partnership Project, 3GPP)". CDMA2000 and UMB are described in documents from the organization named "3rd generation partnership project 2 (3rd Generation Partnership Project 2, 3GPP2)".

The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following describes the embodiments of the present disclosure with reference to the accompanying drawings. A method for determining a networking mode supported by a cell and a device provided in the embodiments of the present disclosure may be applied to a wireless communications system. FIG. 1 is a schematic architectural diagram of a wireless communications system according to an embodiment of the present disclosure. As shown in FIG. 1, the wireless communications system may include: a network device 10 and a terminal device 11. For example, the terminal device is denoted as UE (User Equipment) 11, and the UE 11 may communicate with the network device 10 (transmit signaling or data). In actual application, a connection between the devices is a wireless connection. For ease of visually indicating a connection relationship between the devices, solid lines are used for illustration in the figure. It should be noted that the communications system may include a plurality of UE 11, and the network device 10 may communicate with the plurality of UE 11.

In this embodiment of the present disclosure, the terminal device may be a mobile phone, a tablet computer, a notebook computer, an ultra-mobile personal computer (Ultra-Mobile Personal Computer, UMPC), a netbook, a personal digital assistant (personal digital assistant, PDA), a mobile Internet device (Mobile Internet Device, MID), a wearable device (Wearable Device), an in-vehicle device, or the like.

The network device 10 provided in this embodiment of the present disclosure may be a base station. The base station may be a commonly used base station, or may be an evolved NodeB (evolved node base station, eNB), or may be a device such as a network device in a 5G system (for example, a next generation NodeB (next generation node base station, gNB) or a transmission and reception point (transmission mid reception point, TRP)).

Figure 2:
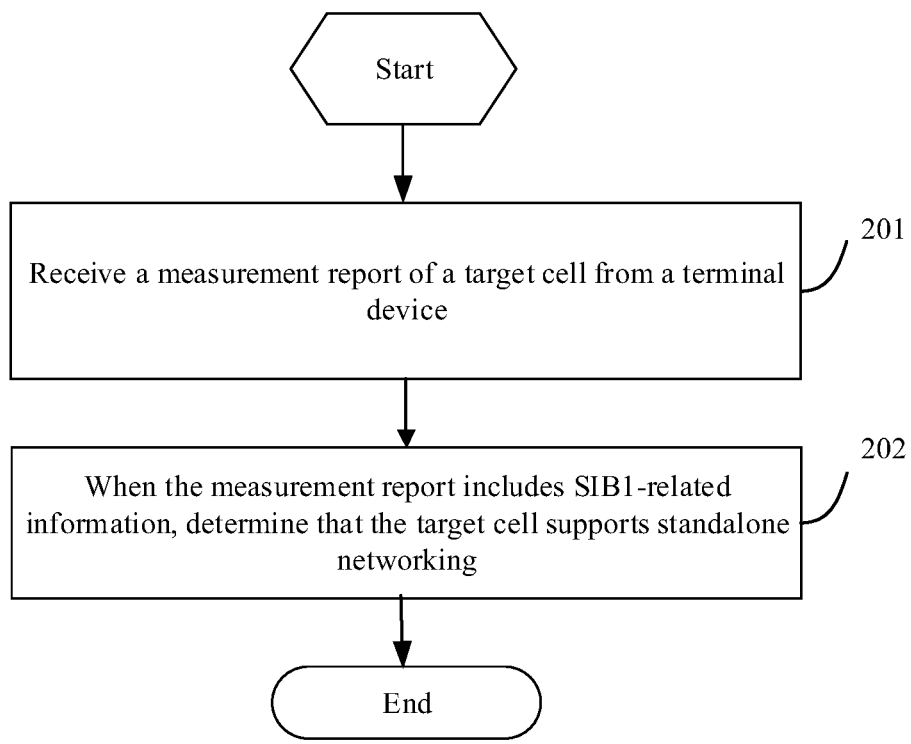
FIG. 2 is a flowchart 1 of a method for determining a networking mode supported by a cell according to an embodiment of the present disclosure.

Referring to FIG. 2, the embodiments of the present disclosure provide a method for determining a networking mode supported by a cell. The method may be performed by a network device, and specific steps are as follows:

Step 201: Receive a measurement report of a target cell from a terminal device.

The target cell may be an NR cell. The network device may be an LTE base station or an eLTE base station, and scenarios of the embodiments of the present disclosure may be deployment scenarios of LTE or eLTE and NR heterogeneous systems, and certainly are not limited thereto.

Step 202: When the measurement report includes SIB1-related information, determine that the target cell supports standalone networking (SA).

The SIB1-related information may be used to indicate that content in the SIB1 is incomplete.

For example: when the SIB1 includes A, B, and C, but the SIB1 in the measurement report includes only A and C, or A and B, or B and C, content in the SIB1 is incomplete.

In this embodiment of the present disclosure, optionally, before step 201 or step 202, or after step 201 or step 202, or during execution of step 201 or step 202, the method may further include: sending a first message, where the first message is used to indicate that the SIB1 is not broadcasted.

It may be understood that in the embodiments of the present disclosure, an NR system may have the following limitation: the SIB1 is not broadcasted in an NSA cell, that is, a type of the NR cell in which the SIB1 is broadcasted can be only SA, and the type of the NR cell cannot be SA and NSA at the same time. In this way, the network device may immediately determine, according to the measurement report of the NR cell of the terminal device, that the networking mode supported by the NR cell is SA or NSA.

In the embodiments of the present disclosure, the network device may determine, according to the measurement report, that the networking mode supported by the NR cell is SA or NSA, to help an operator better plan a neighboring cell relationship of a network.

Figure 3:
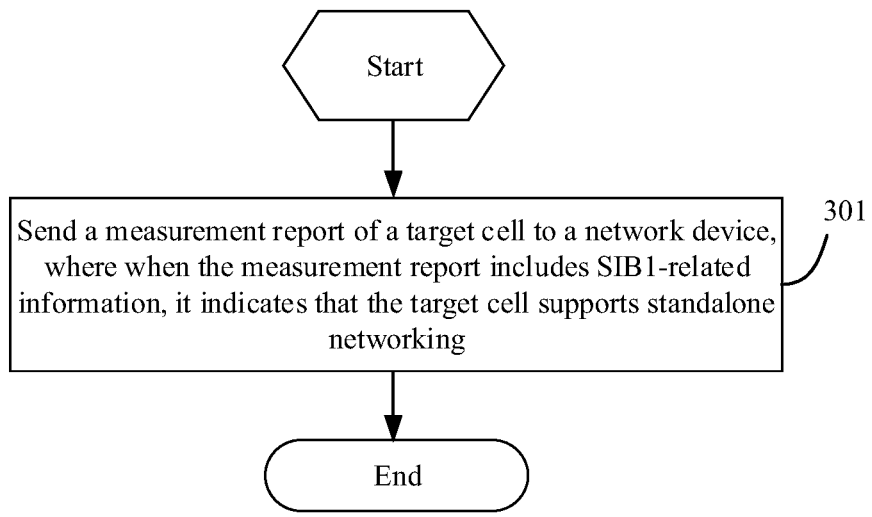
FIG. 3 is a flowchart 2 of a method for determining a networking mode supported by a cell according to an embodiment of the present disclosure.

Referring to FIG. 3, the embodiments of the present disclosure further provide a method for determining a networking mode supported by a cell. The method may be performed by a terminal device, and specific steps are as follows:

Step 301: Send a measurement report of a target cell to a network device, where when the measurement report includes SIB1-related information, it indicates that the target cell supports standalone networking (SA).

The SIB1-related information may be used to indicate that content in the SIB1 is incomplete.

The target cell may be an NR cell. The network device may be an LTE base station or an eLTE base station, and scenarios of the embodiments of the present disclosure may be deployment scenarios of LTE or eLTE and NR heterogeneous systems, and certainly are not limited thereto.

In this embodiment of the present disclosure, optionally, before step 301, or after step 301, or during execution of step 301, the method may further include: receiving a first message from the network device, where the first message is used to indicate that the SIB1 is not broadcasted.

It may be understood that in the embodiments of the present disclosure, an NR system may have the following limitation: the SIB1 is not broadcasted in an NSA cell, that is, a type of the NR cell in which the SIB1 is broadcasted can be only SA, and the type of the NR cell cannot be SA and NSA at the same time. In this way, the network device may immediately determine, according to the measurement report of the NR cell of the terminal device, that the type of the NR cell is SA or NSA.

In the embodiments of the present disclosure, the network device may determine, according to the measurement report, that the networking mode supported by the NR cell is SA or NSA, to help an operator better plan a neighboring cell relationship of a network.

Figure 4:
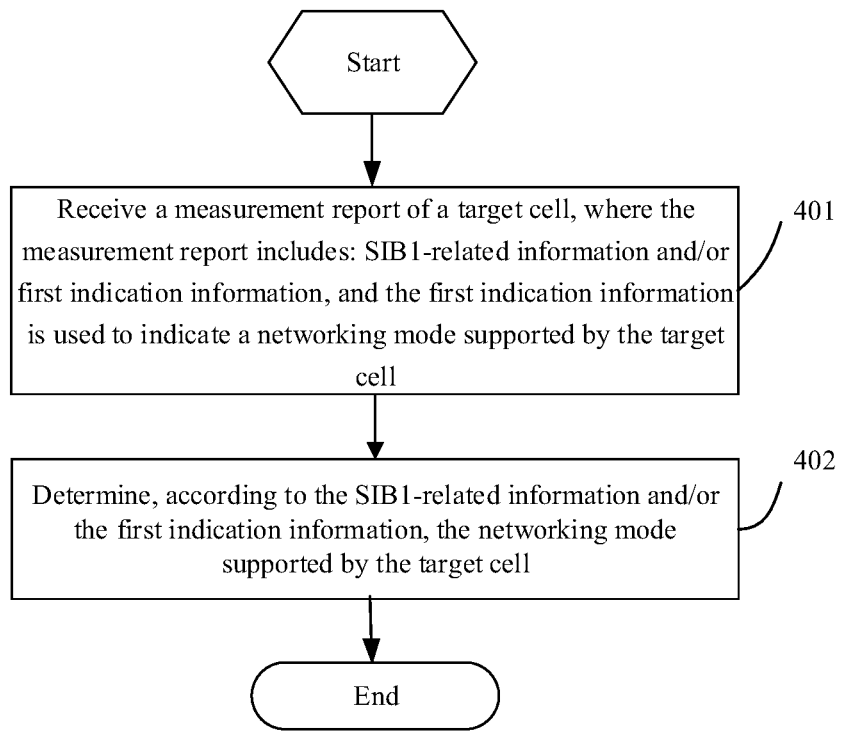
FIG. 4 is a flowchart 3 of a method for determining a networking mode supported by a cell according to an embodiment of the present disclosure.

Referring to FIG. 4, the embodiments of the present disclosure further provide a method for determining a networking mode supported by a cell. The method may be performed by a network device, and specific steps are as follows:

Step 401: Receive a measurement report of a target cell from a terminal device, where the measurement report includes: SIB1-related information and/or first indication information, and the first indication information is used to indicate a networking mode (for example: SA, NSA, or SA+NSA) supported by the target cell.

It may be understood that the SIB1-related information in the measurement report may be replaced by remaining minimum system information (Remaining minimum system information, RMSI)-related information, that is, the measurement report may include: RMSI-related information and/or the first indication information.

The target cell may also be referred to as an NR cell. The network device may be an LTE base station or an eLTE base station, and scenarios of the embodiments of the present disclosure may be deployment scenarios of LTE or eLTE and NR heterogeneous systems, and certainly are not limited thereto.

The SIB1-related information may be used to indicate whether content in the SIB1 is complete.

In the embodiments of the present disclosure, content included in the measurement report may have the following three cases:

(1) the measurement report may include: the SIB1-related information;

(2) the measurement report may include: the first indication information; and (3) the measurement report may include: the SIB1-related information and the first indication information.

Step 402: Determine, according to the SIB1-related information and/or the first indication information, the networking mode supported by the target cell.

It may be understood that in step 402, the networking mode supported by the target cell may be determined in the following three manners:

Manner 1: Determine the type of the target cell according to the first indication information.

Manner 2: Determine, according to the SIB1-related information, the networking mode supported by the target cell.

Manner 3: Determine, according to the SIB1-related information and the first indication information, the networking mode supported by the target cell.

In the embodiments of the present disclosure, optionally, the measurement report includes: the first indication information, and the first indication information includes: first bit information and/or second bit information; and Optionally, the first bit information may indicate whether the target cell supports SA, and the second bit information may indicate whether the target cell supports NSA. Alternatively, the first bit information is used to indicate whether the target cell supports NSA, and the second bit information is used to indicate whether the target cell supports SA.

Optionally, in step 402, manner 1 may be implemented in any one of the following manners:

(1) when a value of the first bit information is a first value, and/or a value of the second bit information is a second value, determining that the target cell supports standalone networking (SA);

For example: when a value of the first bit information is 1, and/or a value of the second bit information is 0, it is determined that the target cell supports standalone networking.

(2) When a value of the first bit information is a second value, and/or a value of the second bit information is a first value, it is determined that the target cell supports non-standalone networking (NSA).

For example: when a value of the first bit information is 0, and/or a value of the second bit information is 1, it is determined that the target cell supports non-standalone networking.

(3) When a value of the first bit information is a first value, and a value of the second bit information is the first value, it is determined that the target cell supports non-standalone networking and standalone networking (SA+NSA).

That is, when a value of the first bit information is the same as a value of the second bit information, it is determined that the target cell supports non-standalone networking and standalone networking. For example: when a value of the first bit information is 1, and a value of the second bit information is 1, it is determined that the target cell supports non-standalone networking and standalone networking.

(4) When a value of the first bit information is a second value, and a value of the second bit information is the second value, it is determined that the target cell supports a first type, where system information broadcasted in a cell of the first type does not include the SIB1 (or RMSI).

That is, when a value of the first bit information is the same as a value of the second bit information, it is determined that the target cell supports a first type. For example: when a value of the first bit information is 0, and a value of the second bit information is 0, it is determined that the target cell supports the first type.

In the embodiments of the present disclosure, optionally, the measurement report includes: the SIB1-related information.

Optionally, in step 402, manner 2 may be implemented in any one of the following manners:

when the SIB1-related information indicates that content in the SIB1 is complete, determining that the target cell supports standalone networking (SA); or when the SIB1-related information indicates that content in the SIB1 is incomplete, determining that the target cell supports non-standalone networking (NSA); or Optionally, that content in the SIB1 is incomplete may refer to at least one of the following: the SIB1 has no TAC, the SIB1 has no paging (paging) information, and the SIB1 has no random access channel (Random Access Channel, RACH) information.

Whether the SIB1 includes the TAC is used as an example. When the SIB1 has no TAC, it indicates that content in the SIB1 is incomplete, or when the SIB1 has the TAC, it indicates that content in the SIB1 is complete. For example: when the SIB1 includes the PLMN, but does not include the TAC, the target cell supports NSA; or when the SIB1 includes the PLMN and the TAC, the target cell supports SA.

Whether the SIB1 includes the paging information is used as an example. When the SIB1 has no paging information, it indicates that content in the SIB1 is incomplete, or when the SIB1 has the paging information, it indicates that content in the SIB1 is complete. For example: when the SIB1 includes the PLMN, but does not include the paging information, the target cell supports NSA. When the SIB1 includes the PLMN and the paging information, the target cell supports SA.

Whether the SIB1 includes the RACH information is used as an example. When the SIB1 has no RACH information, it indicates that content in the SIB1 is incomplete, or when the SIB1 has the RACH information, it indicates that content in the SIB1 is complete. For example: when the SIB1 includes the PLMN, but does not include the RACH information, the target cell supports NSA; or when the SIB1 includes the PLMN and the RACH information, the target cell supports SA.

It may be understood that in manner 1 and manner 2, two bits (bit) may be set in the SIB1 of the NR cell, to indicate whether the NR cell supports NSA, or supports SA, or supports SA and NSA, or that the system information of the NR cell has no SIB1 (or RMSI), for example: a value of the first bit is 1 or 0 and a value of the second bit is 0 or 1.

(1) The first bit indicates whether the NR cell supports SA, and the second bit indicates whether the NR cell supports NSA.

When values of the first bit and the second bit are the same, it indicates that the NR cell supports NSA+SA, or the system information of the NR cell has no RMSI.

In this way, when the terminal device reports the measurement report of the NR cell, it may be determined, according to bit values in the SIB1, whether the NR cell supports the networking mode of NSA, SA, or SA+NSA.

(2) The first bit indicates whether the NR cell supports NSA, and the second bit indicates whether the NR cell supports SA.

When values of the first bit and the second bit are the same, it indicates that the NR cell supports NSA+SA, or the system information of the NR cell has no RMSI.

In this way, when the terminal device reports the measurement report of the NR cell, a base station of an original cell may determine, according to bit values in the SIB1, whether the NR cell supports the networking mode of NSA, SA, or SA+NSA.

Optionally, in step 402, manner 3 may be implemented in the following manners:

The measurement report includes: the SIB1-related information and the first indication information, and the first indication information includes third bit information; and the third bit information is used to indicate that the target cell supports non-standalone networking and standalone networking.

when the SIB1-related information indicates that content in the SIB1 is complete, and a value of the third indication information is a third value, determining that the target cell supports standalone networking and non-standalone networking (SA+NSA).

Further, the third indication information may be information of 1 bit, for example: the value of the third indication information is 1 or 0, and certainly is not limited thereto. The third indication information having the value 1 or 0 may be used to indicate that a type of the target cell is SA+NSA.

Whether the SIB1 includes the TAC is used as an example. When the SIB1 has no TAC, it indicates that content in the SIB1 is incomplete, or when the SIB1 has the TAC, it indicates that content in the SIB1 is complete. For example: when the SIB1 includes the PLMN, but does not include the TAC, the target cell supports NSA; or when the SIB1 includes the PLMN and the TAC, the target cell supports SA. When the SIB1 includes the PLMN and the TAC, and the value of the third indication information is 1 or 0, the target cell supports SA+NSA.

In the embodiments of the present disclosure, the networking mode supported by the NR cell may be determined, to help an operator better plan a neighboring cell relationship of a network.

Figure 5:
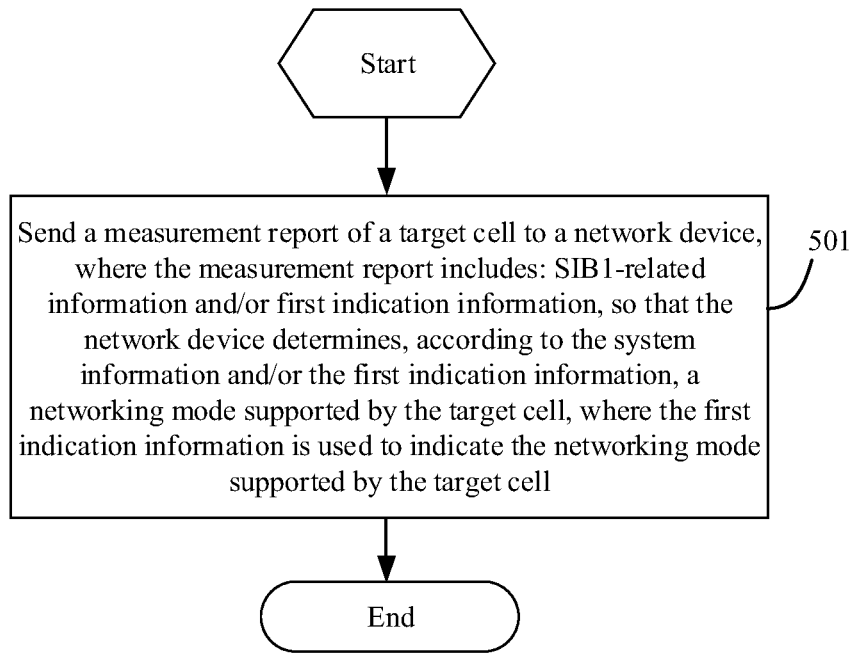
FIG. 5 is a flowchart 4 of a method for determining a networking mode supported by a cell according to an embodiment of the present disclosure.

Referring to FIG. 5, the embodiments of the present disclosure further provide a method for determining a networking mode supported by a cell. The method may be performed by a terminal device, and specific steps are as follows:

Step 501: Send a measurement report of a target cell to a network device, where the measurement report includes: SIB1-related information and/or first indication information, so that the network device determines, according to the system information and/or the first indication information, a networking mode supported by the target cell, where the first indication information is used to indicate the networking mode (for example: SA, NSA, or SA+NSA) supported by the target cell.

In the embodiments of the present disclosure, optionally, the measurement report includes: the first indication information, the first indication information includes: the first bit information and/or the second bit information; the first bit information is used to indicate whether the target cell supports standalone networking, the second bit information is used to indicate whether the target cell supports non-standalone networking; or the first bit information is used to indicate whether the target cell supports non-standalone networking, and the second bit information is used to indicate whether the target cell supports standalone networking.

In the embodiments of the present disclosure, optionally, when a value of the first bit information is a first value, and/or a value of the second bit information is a second value, it indicates that the target cell supports standalone networking;

when a value of the first bit information is a second value, and/or a value of the second bit information is a first value, it indicates that the target cell supports non-standalone networking;

when a value of the first bit information is a first value, and a value of the second bit information is the first value, it indicates that the target cell supports non-standalone networking and standalone networking; or when a value of the first bit information is a second value, and a value of the second bit information is the second value, it indicates that the target cell supports a first type, where system information broadcasted in a cell of the first type does not include the SIB1.

In the embodiments of the present disclosure, optionally, the measurement report includes: the SIB1-related information; when the SIB1-related information indicates that content in the SIB1 is complete, it is determined that the target cell supports standalone networking; when the SIB1-related information indicates that content in the SIB1 is incomplete, it is determined that the target cell supports non-standalone networking.

In the embodiments of the present disclosure, optionally, the measurement report includes: the SIB1-related information and the first indication information, the first indication information includes the third bit information; when the SIB1-related information indicates that content in the SIB1 is complete, and a value of the third bit information is a third value (for example, 1 or 0), it is determined that the target cell supports standalone networking and non-standalone networking.

In the embodiments of the present disclosure, the networking mode supported by the NR cell may be determined, to help an operator better plan a neighboring cell relationship of a network.

Figure 6:
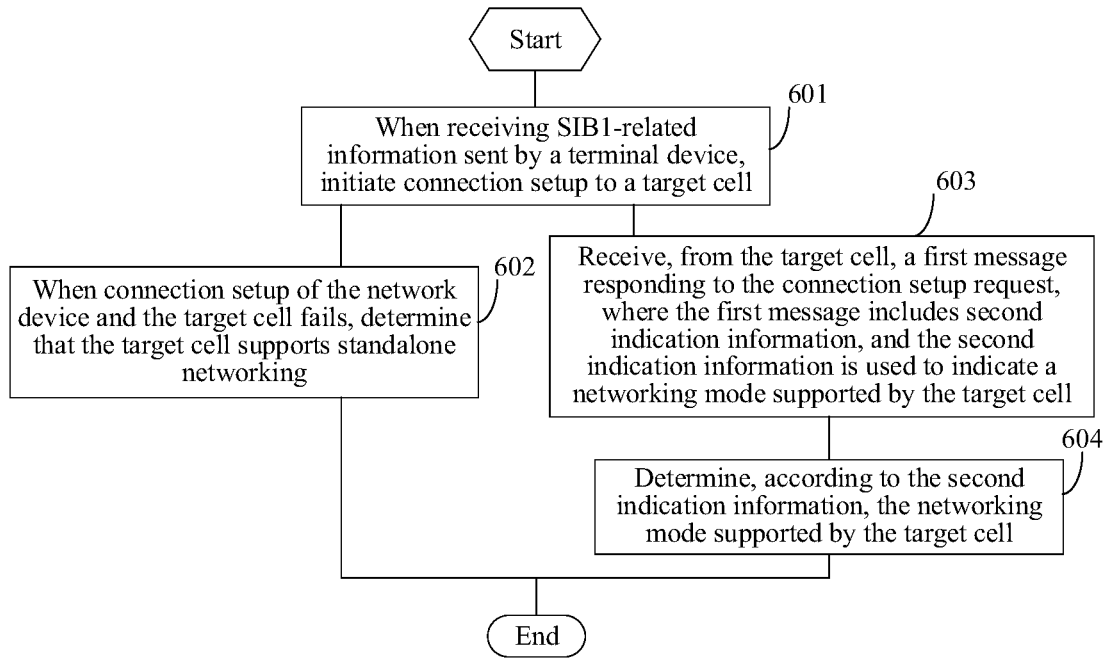
FIG. 6 is a flowchart 5 of a method for determining a networking mode supported by a cell according to an embodiment of the present disclosure.

Referring to FIG. 6, the embodiments of the present disclosure further provide a method for determining a networking mode supported by a cell. The method may be performed by a network device, and specific steps are as follows:

Step 601: When receiving SIB1-related information sent by a terminal device, send a connection setup request to a target cell. Then, step 602 or step 603 is performed.

It may be understood that the SIB1-related information sent by the terminal device and received in step 601 may indicate: content of the SIB1 is complete, or content of the SIB1 is incomplete.

Step 602: When connection setup of the network device and the target cell fails, determine that the target cell supports standalone networking.

Step 603: Receive, from the target cell, a first message responding to the connection setup request, where the first message includes second indication information, and the second indication information is used to indicate a networking mode supported by the target cell. Then, step 604 is performed.

Step 604: Determine, according to the second indication information, the networking mode supported by the target cell.

In the embodiments of the present disclosure, optionally, the method further includes: when connection setup of the network device and the target cell fails, receiving a second message from the target cell, where the second message includes: a cause value of failure, and the cause value of failure is used to indicate that the target cell supports standalone networking. For example: the second message is an X2 SETUP FAILURE message.

In this embodiment of the present disclosure, optionally, the method further includes:

When connection setup of the network device and the target cell fails, skipping responding to the connection setup request (that is, ignoring the connection setup request), and notifying that the target cell supports standalone networking; or when connection setup of the network device and the target cell fails, skipping responding to the connection setup request (that is, ignoring the connection setup request).

In the embodiments of the present disclosure, optionally, the second indication information includes: the third bit information and/or the fourth bit information; the third bit information is used to indicate whether the target cell supports standalone networking, the fourth bit information is used to indicate whether the target cell supports non-standalone networking; or the third bit information is used to indicate whether the target cell supports non-standalone networking, and the fourth bit information is used to indicate whether the target cell supports standalone networking.

Optionally, in the embodiments of the present disclosure, in step 604, the networking mode supported by the target cell may be determined in the following manners:

(1) when a value of the first bit information is a first value, and/or a value of the second bit information is a second value, determining that the target cell supports standalone networking (SA).

For example, when a value of the first bit information is 1, and/or a value of the second bit information is 0, it is determined that the target cell supports standalone networking.

(2) When a value of the third bit information is a second value, and/or a value of the fourth bit information is a first value, it is determined that the target cell supports non-standalone networking (NSA).

For example: when a value of the third bit information is 0, and/or a value of the fourth bit information is 1, it is determined that the target cell supports non-standalone networking.

(3) When a value of the third bit information is a first value, and a value of the fourth bit information is the first value, it is determined that the target cell supports non-standalone networking and standalone networking (SA+NSA).

That is, when a value of the third bit information is the same as a value of the fourth bit information, it is determined that the target cell supports non-standalone networking and standalone networking. For example: when a value of the first bit information is 1, and a value of the second bit information is 1, it is determined that the target cell supports non-standalone networking and standalone networking.

(4) When a value of the third bit information is a second value, and a value of the fourth bit information is the second value, it is determined that the target cell supports a second type, where system information broadcasted in a cell of the second type does not include the SIB1 (or RMSI).

That is, when a value of the third bit information is the same as a value of the fourth bit information, it is determined that the target cell supports a first type. For example: when a value of the first bit information is 0, and a value of the second bit information is 0, it is determined that the target cell supports the first type. That is, system information broadcasted in the target cell has no SIB1.

In the embodiments of the present disclosure, the networking mode supported by the cell may be determined, to help an operator better plan a neighboring cell relationship of a network.

Figure 7:
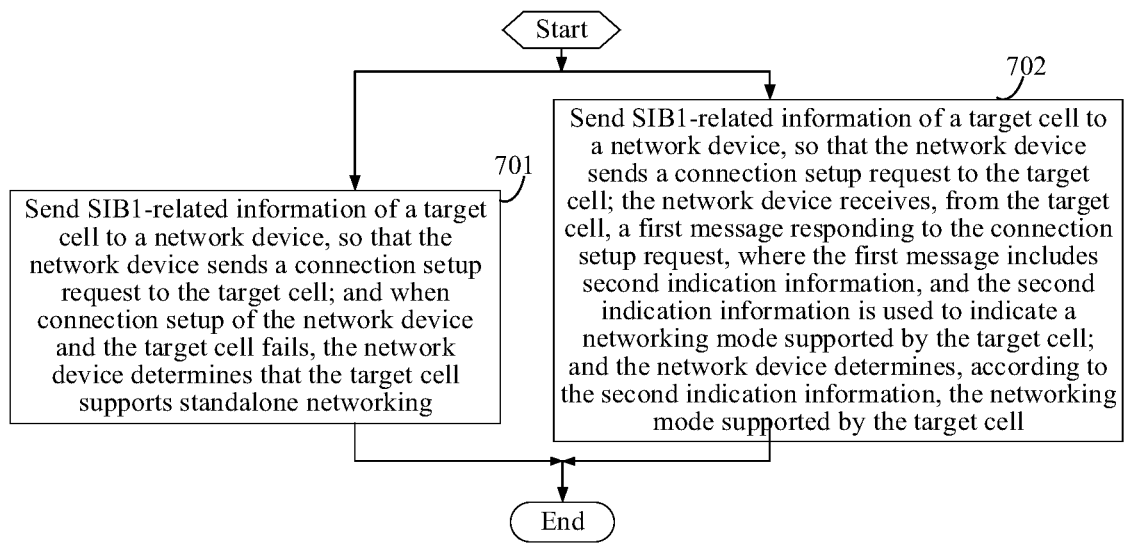
FIG. 7 is a flowchart 6 of a method for determining a networking mode supported by a cell according to an embodiment of the present disclosure.

Referring to FIG. 7, the embodiments of the present disclosure further provide a method for determining a networking mode supported by a cell. The method may be performed by a terminal device, and specific steps are as follows:

Step 701: Send SIB1-related information of a target cell to a network device, so that the network device sends a connection setup request to the target cell; and when connection setup of the network device and the target cell fails, the network device determines that a networking mode supported by the target cell is standalone networking.

or

Step 702: Send SIB1-related information of a target cell to a network device, so that the network device sends a connection setup request to the target cell; the network device receives, from the target cell, a first message responding to the connection setup request, where the first message includes second indication information, and the second indication information is used to indicate a type of the target cell (SA, NSA, or SA+NSA); and the network device determines, according to the second indication information, the networking mode supported by the target cell.

In the embodiments of the present disclosure, optionally, the second indication information includes: third bit information and/or fourth bit information. The third bit information is used to indicate whether the target cell supports standalone networking, the fourth bit information is used to indicate whether the target cell supports non-standalone networking; or the third bit information is used to indicate whether the target cell supports non-standalone networking, and the fourth bit information is used to indicate whether the target cell supports standalone networking.

In the embodiments of the present disclosure, (1) when a value of the third bit information is a first value, and/or a value of the fourth bit information is a second value, it indicates that the target cell supports standalone networking (SA).

For example, when a value of the third bit information is 1, and/or a value of the fourth bit information is 0, it indicates that the target cell supports standalone networking.

(2) When a value of the third bit information is a second value, and/or a value of the fourth bit information is a first value, it indicates that the target cell supports non-standalone networking (NSA).

For example: when a value of the third bit information is 0, and/or a value of the fourth bit information is 1, it indicates that the target cell supports non-standalone networking.

(3) When a value of the third bit information is a first value, and a value of the fourth bit information is the first value, it indicates that the target cell supports non-standalone networking and standalone networking (SA+NSA).

That is, when a value of the third bit information is the same as a value of the fourth bit information, it is determined that the target cell supports non-standalone networking and standalone networking.

For example: when a value of the third bit information is 1, and a value of the fourth bit information is 1, it indicates that the target cell supports non-standalone networking and standalone networking.

(4) When a value of the third bit information is a second value, and a value of the fourth bit information is the second value, it indicates that the target cell supports a second type, where system information broadcasted in a cell of the second type does not include the SIB1 (or RMSI).

That is, when a value of the third bit information is the same as a value of the fourth bit information, it indicates that the target cell supports a second type. For example: when a value of the third bit information is 0, and a value of the fourth bit information is 0, it indicates that the target cell supports the second type.

For example:

The terminal device normally reports a CGI of the NR cell.

If content reported by the terminal device does not include the SIB1, an LTE base station may send an X2 interface setup request, or an eLTE base station may send an Xn interface setup request.

If content reported by the terminal device includes the SIB1 (for example, content in the SIB1 is complete, or content in the SIB1 is incomplete):

(1) An LTE base station may send an X2 interface setup request. If setup of the X2 interface fails, the LTE base station determines that the NR cell supports SA, and no longer attempts to set up EN-DC. The NR cell may record the X2 interface setup request of the LTE base station. If the NR cell also supports a NSA function, the NR cell may actively set up an X2 interface with the LTE base station, or the system information broadcasted in the NR cell does not include the SIB1.

Further, if setup of the X2 interface fails, the NR cell notifies a cause value of failure of setup failure of the X2 interface. The cause value of failure (cause value of failure) is used to indicate that the NR cell supports SA.

Further, if setup of the X2 interface fails, the connection setup request is not responded to (for example, X2 SETUP REQUEST), and it is notified that the NR cell supports SA.

Further, if setup of the X2 interface fails, the connection setup request is only not responded to (for example, X2 SETUP REQUEST), that is, the connection setup request is only ignored.

(2) The eLTE base station sends an Xn interface setup request, and a response message of the Xn interface setup request indicates that the NR cell supports SA, NSA, or SA+NSA. For example: the response message may indicate the type of the NR cell by using two bits.

An embodiment of the present disclosure further provides a network device. Because a problem-solving principle of the network device is similar to that of the method for determining a networking mode supported by a cell in the embodiments of the present disclosure, for implementation of the network device, refer to implementation of the method, and no repeated description is provided.

Figure 8:
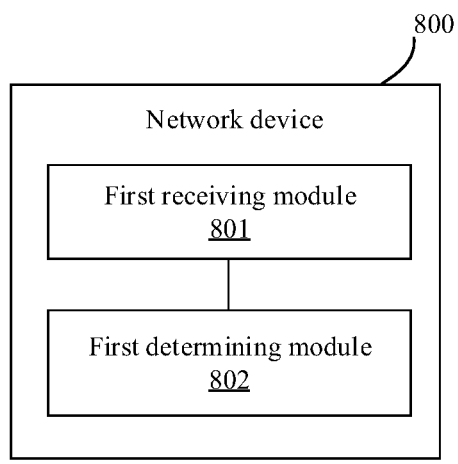
FIG. 8 is a structural diagram 1 of a network device according to an embodiment of the present disclosure.

Referring to FIG. 8, an embodiment of the present disclosure further provides a network device 800, including:

a first receiving module 801, configured to receive a measurement report of a target cell from a terminal device; and a first determining module 802, configured to: when the measurement report includes SIB1-related information, determine that the target cell supports standalone networking.

The SIB1-related information may be used to indicate that content in the SIB1 is incomplete.

In this embodiment of the present disclosure, optionally, the network device further includes:

a first sending module, configured to send a first message, where the first message is used to indicate that the SIB1 is not broadcasted.

The network device provided in this embodiment of the present disclosure may perform the foregoing method embodiment. An implementation principle and a technical effect of the network device are similar to those of the method embodiment, and details are not described again in this embodiment.

An embodiment of the present disclosure further provides a terminal device. Because a problem-solving principle of the terminal device is similar to that of the method for determining a networking mode supported by a cell in the embodiments of the present disclosure, for implementation of the terminal device, refer to implementation of the method, and no repeated description is provided.

Figure 9:
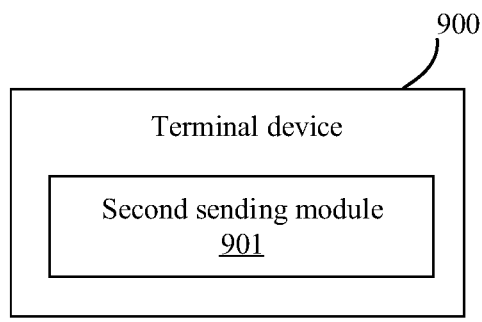
FIG. 9 is a structural diagram 1 of a terminal device according to an embodiment of the present disclosure.

Referring to FIG. 9, an embodiment of the present disclosure further provides a terminal device 900, including:

a second sending module 901, configured to send a measurement report of a target cell to a network device, where when the measurement report includes SIB1-related information, it indicates that the target cell supports standalone networking.

The SIB1-related information may be used to indicate that content in the SIB1 is incomplete.

In this embodiment of the present disclosure, optionally, the terminal device further includes:

a second receiving module, configured to receive a first message from a network device, where the first message is used to indicate that the SIB1 is not broadcasted.

The terminal device provided in this embodiment of the present disclosure may perform the foregoing method embodiment. An implementation principle and a technical effect of the terminal device are similar to those of the method embodiment, and details are not described again in this embodiment.

An embodiment of the present disclosure further provides a network device. Because a problem-solving principle of the network device is similar to that of the method for determining a networking mode supported by a cell in the embodiments of the present disclosure, for implementation of the network device, refer to implementation of the method, and no repeated description is provided.

Figure 10:
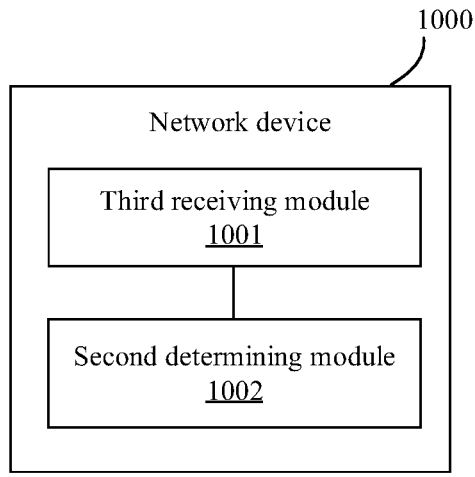
FIG. 10 is a structural diagram 2 of a network device according to an embodiment of the present disclosure.

Referring to FIG. 10, an embodiment of the present disclosure further provides a network device 1000, including:

a third receiving module 1001, configured to receive a measurement report of a target cell from a terminal device, where the measurement report includes: SIB1-related information and/or first indication information, and the first indication information is used to indicate a networking mode supported by the target cell; and a second determining module 1002, configured to determine, according to the SIB1-related information and/or the first indication information, the networking mode supported by the target cell.

In the embodiments of the present disclosure, optionally, the measurement report includes: the first indication information, and the first indication information includes: first bit information and/or second bit information; and the first bit information is used to indicate whether the target cell supports standalone networking, and the second bit information is used to indicate whether the target cell supports non-standalone networking; or the first bit information is used to indicate whether the target cell supports non-standalone networking, and the second bit information is used to indicate whether the target cell supports standalone networking.

In this embodiment of the present disclosure, optionally, the second determining module is further configured to perform any one of the following:

when a value of the first bit information is a first value, and/or a value of the second bit information is a second value, determining that the target cell supports standalone networking;

when a value of the first bit information is a second value, and/or a value of the second bit information is a first value, determining that the target cell supports non-standalone networking;

when a value of the first bit information is a first value, and a value of the second bit information is the first value, determining that the target cell supports non-standalone networking and standalone networking; or when a value of the first bit information is a second value, and a value of the second bit information is the second value, determining that the target cell supports a first type, where system information broadcasted in a cell of the first type does not include the SIB1.

In the embodiments of the present disclosure, optionally, the measurement report includes: the SIB1-related information. The second determining module is further configured to: when the SIB1-related information indicates that content in the SIB1 is complete, determine that the target cell supports standalone networking; or when the SIB1-related information indicates that content in the SIB1 is incomplete, determine that the target cell supports non-standalone networking.

In this embodiment of the present disclosure, optionally, the measurement report includes: the SIB1-related information and the first indication information, and the first indication information includes the third bit information. The second determining module is further configured to: when the SIB1-related information indicates that content in the SIB1 is complete, and a value of the third bit information is a third value, determine that the target cell supports standalone networking and non-standalone networking.

The network device provided in this embodiment of the present disclosure may perform the foregoing method embodiment. An implementation principle and a technical effect of the network device are similar to those of the method embodiment, and details are not described again in this embodiment.

An embodiment of the present disclosure further provides a terminal device. Because a problem-solving principle of the terminal device is similar to that of the method for determining a networking mode supported by a cell in the embodiments of the present disclosure, for implementation of the terminal device, refer to implementation of the method, and no repeated description is provided.

Figure 11:
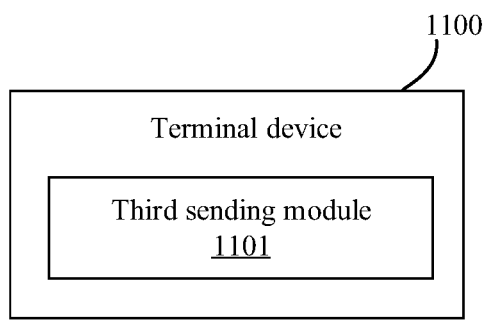
FIG. 11 is a structural diagram 2 of a terminal device according to an embodiment of the present disclosure.

Referring to FIG. 11, an embodiment of the present disclosure further provides a terminal device 1100, including:

a third sending module 1101, configured to send a measurement report of a target cell to a network device, where the measurement report includes: SIB1-related information and/or first indication information, so that the network device determines, according to the SIB1-related information and/or the first indication information, a networking mode supported by the target cell, where the first indication information is used to indicate the networking mode supported by the target cell.

In the embodiments of the present disclosure, optionally, the measurement report includes: the first indication information, and the first indication information includes: first bit information and/or second bit information; and the first bit information is used to indicate whether the target cell supports standalone networking, and the second bit information is used to indicate whether the target cell supports non-standalone networking;

or the first bit information is used to indicate whether the target cell supports non-standalone networking, and the second bit information is used to indicate whether the target cell supports standalone networking.

In this embodiment of the present disclosure, optionally, when a value of the first bit information is a first value, and/or a value of the second bit information is a second value, it indicates that the target cell supports standalone networking;

when a value of the first bit information is a second value, and/or a value of the second bit information is a first value, it indicates that the target cell supports non-standalone networking;

when a value of the first bit information is a first value, and a value of the second bit information is the first value, it indicates that the target cell supports non-standalone networking and standalone networking; or when a value of the first bit information is a second value, and a value of the second bit information is the second value, it indicates that the target cell supports a first type, where system information broadcasted in a cell of the first type does not include the SIB1.

In the embodiments of the present disclosure, optionally, the measurement report includes: the SIB1-related information; when the SIB1-related information indicates that content in the SIB1 is complete, it indicates that the target cell supports standalone networking; when the SIB1-related information indicates that content in the SIB1 is incomplete, it indicates that the target cell supports non-standalone networking.

In the embodiments of the present disclosure, optionally, the measurement report includes: the SIB1-related information and the first indication information, the first indication information includes the third bit information, when the SIB1-related information indicates that content in the SIB1 is complete, and a value of the third bit information is a third value, it indicates that the target cell supports standalone networking and non-standalone networking.

The terminal device provided in this embodiment of the present disclosure may perform the foregoing method embodiment. An implementation principle and a technical effect of the terminal device are similar to those of the method embodiment, and details are not described again in this embodiment.

An embodiment of the present disclosure further provides a network device. Because a problem-solving principle of the network device is similar to that of the method for determining a networking mode supported by a cell in the embodiments of the present disclosure, for implementation of the network device, refer to implementation of the method, and no repeated description is provided.

Figure 12:
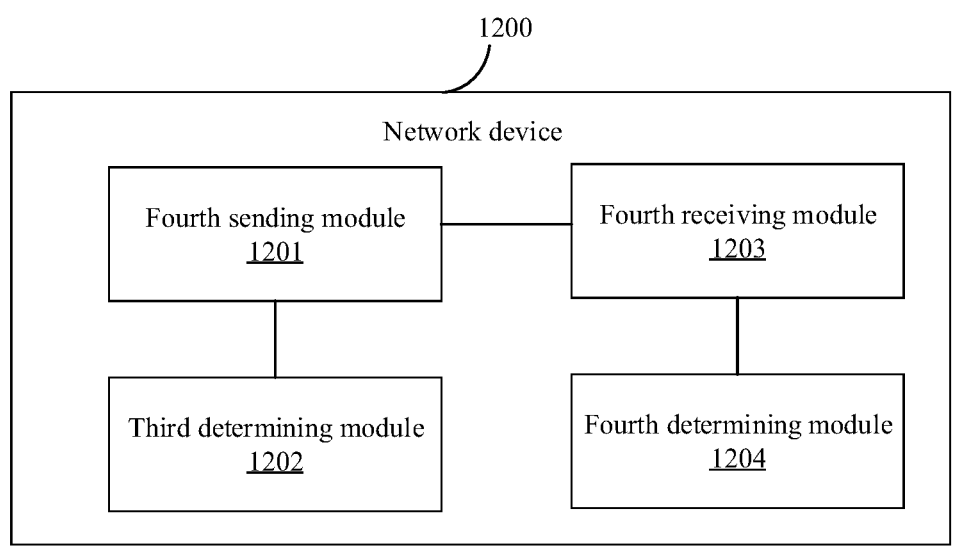
FIG. 12 is a structural diagram 3 of a network device according to an embodiment of the present disclosure.

Referring to FIG. 12, an embodiment of the present disclosure further provides a network device 1200, including:

a fourth sending module 1201, configured to: when receiving SIB1-related information sent by a terminal device, send a connection setup request to a target cell; and a third determining module 1202, configured to: when connection setup of the network device and the target cell fails, determine that the target cell supports standalone networking; or a fourth receiving module 1203, configured to: receive, from the target cell, a first message responding to the connection setup, where the first message includes second indication information, and the second indication information is used to indicate a networking mode supported by the target cell; and a fourth determining module 1204, configured to determine, according to the second indication information, the networking mode supported by the target cell.

In this embodiment of the present disclosure, optionally, the network device further includes:

a fifth receiving module, configured to: when connection setup of the network device and the target cell fails, receive a second message from the target cell, where the second message includes: information related to a failure cause for the connection setup failure, and the information related to the failure cause is used to indicate that the target cell supports standalone networking.

In this embodiment of the present disclosure, optionally, the network device further includes:

a processing module, configured to: when connection setup of the network device and the target cell fails, skip responding to the connection setup request, and notify that the target cell supports standalone networking; or when connection setup of the network device and the target cell fails, skip responding to the connection setup request.

In the embodiments of the present disclosure, optionally, the second indication information includes: third bit information and/or fourth bit information; and the third bit information is used to indicate whether the target cell supports standalone networking, and the fourth bit information is used to indicate whether the target cell supports non-standalone networking; or the third bit information is used to indicate whether the target cell supports non-standalone networking, and the fourth bit information is used to indicate whether the target cell supports standalone networking.

In this embodiment of the present disclosure, optionally, the fourth determining module is further configured to perform any one of the following:

when a value of the third bit information is a first value, and/or a value of the fourth bit information is a second value, determining that the target cell supports standalone networking;

when a value of the third bit information is a second value, and/or a value of the fourth bit information is a first value, determining that the target cell supports non-standalone networking;

when a value of the third bit information is a first value, and a value of the fourth bit information is the first value, determining that the target cell supports non-standalone networking and standalone networking; or when a value of the third bit information is a second value, and a value of the fourth bit information is the second value, determining that a type of the target cell is a first type, where system information broadcasted in a cell of the first type does not include the SIB1.

The network device provided in this embodiment of the present disclosure may perform the foregoing method embodiment. An implementation principle and a technical effect of the network device are similar to those of the method embodiment, and details are not described again in this embodiment.

An embodiment of the present disclosure further provides a terminal device. Because a problem-solving principle of the terminal device is similar to that of the method for determining a networking mode supported by a cell in the embodiments of the present disclosure, for implementation of the terminal device, refer to implementation of the method, and no repeated description is provided.

Figure 13:
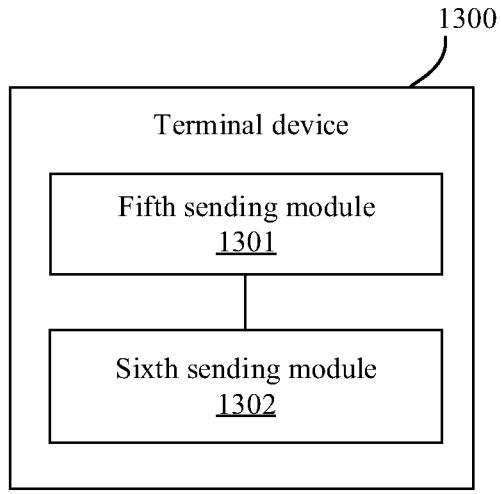
FIG. 13 is a structural diagram 3 of a terminal device according to an embodiment of the present disclosure.

Referring to FIG. 13, an embodiment of the present disclosure provides a terminal device 1300, including:

a fifth sending module 1301, configured to send SIB1-related information of a target cell to a network device, so that the network device sends a connection setup request to the target cell; and when connection setup of the network device and the target cell fails, the network device determines that the target cell supports standalone networking; or a sixth sending module 1302, configured to send SIB1-related information of a target cell to a network device, so that the network device sends a connection setup request to the target cell, where the network device receives, from the target cell, a first message responding to the connection setup request, where the first message includes second indication information, and the second indication information is used to indicate a networking mode supported by the target cell; and the network device determines, according to the second indication information, the networking mode supported by the target cell.

In the embodiments of the present disclosure, optionally, the second indication information includes: third bit information and/or fourth bit information; and the third bit information is used to indicate whether the target cell supports standalone networking, and the fourth bit information is used to indicate whether the target cell supports non-standalone networking; or the third bit information is used to indicate whether the target cell supports non-standalone networking, and the fourth bit information is used to indicate whether the target cell supports standalone networking.

In the embodiments of the present disclosure, optionally, when a value of the third bit information is a first value, and/or a value of the fourth bit information is a second value, it indicates that the target cell supports standalone networking;

when a value of the third bit information is a second value, and/or a value of the fourth bit information is a first value, it indicates that the target cell supports non-standalone networking;

when a value of the third bit information is a first value, and a value of the fourth bit information is the first value, it indicates that the target cell supports non-standalone networking and standalone networking; or when a value of the third bit information is a second value, and a value of the fourth bit information is the second value, it indicates that the target cell supports a second type, where system information broadcasted in a cell of the second type does not include the SIB1.

The terminal device provided in this embodiment of the present disclosure may perform the foregoing method embodiment. An implementation principle and a technical effect of the terminal device are similar to those of the method embodiment, and details are not described again in this embodiment.

Figure 14:
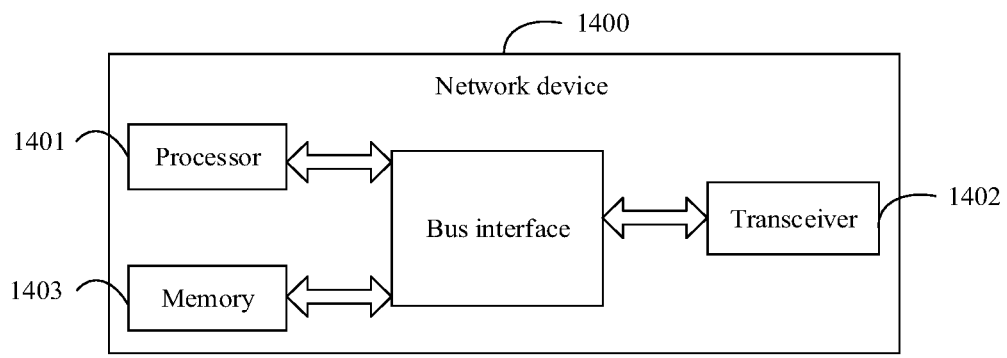
FIG. 14 is a structural diagram 4 of a network device according to an embodiment of the present disclosure.

Referring to FIG. 14, FIG. 14 is a structural diagram of a network device applied to an embodiment of the present disclosure. As shown in FIG. 14, the network device 1400 includes a processor 1401, a transceiver 1402, a memory 1403, and a bus interface.

In an embodiment of the present disclosure, the network device 1400 further includes: a computer program stored in the memory 1403 and executable on the processor 1401. When the computer program is executed by the processor 1401, steps of the method for determining a networking mode supported by a cell in the embodiments of the present disclosure are performed.

In FIG. 14, the bus architecture may include any quantity of interconnected buses and bridges, which are specifically connected together by various circuits of one or more processors represented by the processor 1401 and a memory represented by the memory 1403. The bus architecture may further connect together various other circuits of a peripheral device, a voltage stabilizer, a power management circuit, and the like, which are known in this art and will not be further described herein. The bus interface provides an interface. The transceiver 1402 may include a plurality of elements, that is, include a transmitter and a receiver, and provide units for communication with various other apparatuses on a transmission medium.

The processor 1401 is responsible for managing the bus architecture and common processing, and the memory 1403 may store data used when the processor 1401 performs an operation.

The network device provided in this embodiment of the present disclosure may perform the foregoing method embodiment. An implementation principle and a technical effect thereof are similar, and details are not described again in this embodiment.

Figure 15:
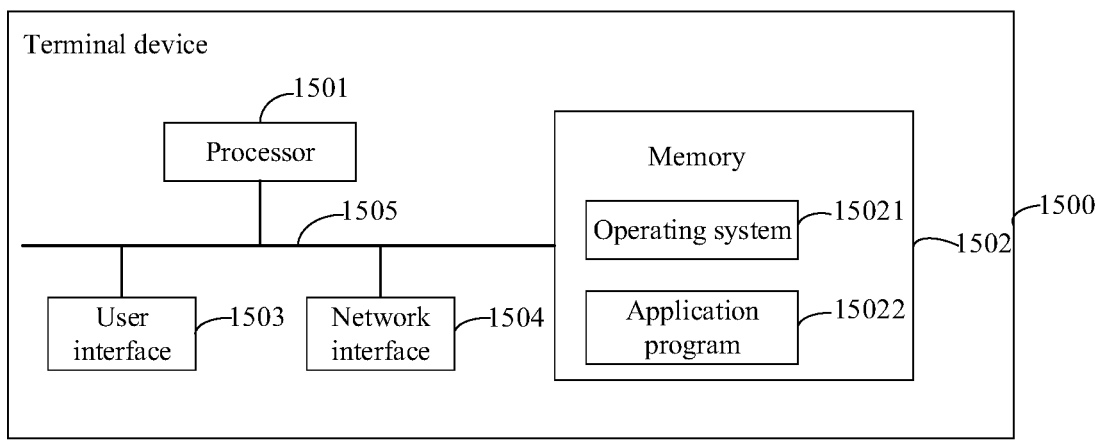
FIG. 15 is a structural diagram 4 of a terminal device according to an embodiment of the present disclosure.

As shown in FIG. 15, a terminal device 1500 shown in FIG. 15 includes: at least one processor 1501, a memory 1502, at least one network interface 1504, and a user interface 1503. Various components of the terminal device 1500 are coupled by using the bus system 1505. It may be understood that the bus system 1505 is configured to implement a connection and communication between these components. In addition to a data bus, the bus system 1505 may include a power bus, a control bus, and a status signal bus. However, for clarity of description, various buses are marked as the bus system 1505 in FIG. 15.

The user interface 1503 may include a display, a keyboard, or a clicking device (for example, a mouse, a trackball (trackball), a touch panel, or a touchscreen).

It may be understood that the memory 1502 in this embodiment of the present disclosure may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. As exemplary but not limitative descriptions, many forms of RAMs may be used, for example, a static random access memory (SRAM, Static RAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 1502 in the system and the method that are described in this embodiment of the present disclosure is to include but is not limited to these memories and a memory of any other proper type.

In some implementations, the memory 1502 stores the following element: an executable module or a data structure, a subset of an executable module or a data structure, or an extended set of an executable module or a data structure: an operating system 15021 and an application program 15022.

The operating system 15021 includes various system programs, for example, a framework layer, a kernel library layer, and a driver layer, and is configured to implement various basic services and process hardware-based tasks. The application program 15022 includes various application programs, for example, a media player (Media Player) and a browser (Browser), and is configured to implement various application services. A program for implementing the method in the embodiments of the present disclosure may be included in the application program 15022.

In an embodiment of the present disclosure, a program or an instruction stored in the memory 1502 is called, specifically, a program or an instruction stored in the application program 15022 may be called, to perform steps of the method for determining a networking mode supported by a cell in the embodiments of the present disclosure.

The terminal device provided in this embodiment of the present disclosure may perform the foregoing method embodiment. An implementation principle and a technical effect thereof are similar, and details are not described again in this embodiment.

Method or algorithm steps described in combination with the content disclosed in the present disclosure may be implemented by hardware, or may be implemented by a processor by executing a software instruction. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be located in application specific integrated circuits (Application Specific Integrated Circuits, ASIC). In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific embodiments. It should be understood that the foregoing descriptions are merely specific implementations of the present disclosure, but are not intended to limit the protection scope of the present disclosure. Any modification, equivalent replacement, improvement, or the like made on a basis of the technical solutions of the present disclosure shall fall within the protection scope of the present disclosure.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a magnetic disk memory, a CD-ROM (Compact Disc Read-Only Memory), an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Those computer program instructions can further be stored a computer readable memory, which can guide the computer or another programmable data processing device, to work in a specific away, so that the instructions stored in the computer readable memory generate a manufactured product including an instruction apparatus. The instruction apparatus implements a specific function in one or more processes in the flowcharts and/or one or more blocks in the block diagrams.

Those computer program instructions can further be loaded in a computer or another programmable data processing device, so that a series of steps are executed in the computer or the programmable device to generate processing for computer implementation. Thus, instructions executed in the computer or another programmable device provide steps for implementing a specific function in one or more processes in the flowcharts and/or one or more blocks in the block diagrams.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

The invention claimed is:

1. A method for determining a networking mode supported by a cell, applied to a network device and comprising:
   when receiving SIB1-related information sent by a terminal device, sending a connection setup request to a target cell; and
   when connection setup of the network device and the target cell fails, determining that the target cell supports standalone networking; or
   receiving, from the target cell, a first message responding to the connection setup request, wherein the first message comprises second indication information, and the second indication information is used to indicate a networking mode supported by the target cell; and
   determining, according to the second indication information, the networking mode supported by the target cell.

2. The method according to claim 1, further comprising:
   when connection setup of the network device and the target cell fails, receiving a second message from the target cell, wherein the second message comprises: information related to a failure cause for the connection setup failure, and the information related to the failure cause is used to indicate that the target cell supports standalone networking.

3. The method according to claim 1, further comprising:
   when connection setup of the network device and the target cell fails, skipping responding to the connection setup request, and notifying that the target cell supports standalone networking; or
   when connection setup of the network device and the target cell fails, skipping responding to the connection setup request.

4. The method according to claim 1, wherein the second indication information comprises: third bit information and/or fourth bit information; and
   the third bit information is used to indicate whether the target cell supports standalone networking, and the fourth bit information is used to indicate whether the target cell supports non-standalone networking; or
   or
   the third bit information is used to indicate whether the target cell supports non-standalone networking, and the fourth bit information is used to indicate whether the target cell supports standalone networking.

5. The method according to claim 4, wherein
   the determining, according to the second indication information, the networking mode supported by the target cell comprises at least any one of the following:
   when a value of the first bit information is a first value, and/or a value of the second bit information is a second value, determining that the target cell supports standalone networking;
   when a value of the third bit information is a second value, and/or a value of the fourth bit information is a first value, determining that the target cell supports non-standalone networking;
   when a value of the first bit information is a first value, and a value of the second bit information is the first value, determining that the target cell supports non-standalone networking and standalone networking; or
   when a value of the third bit information is a second value, and a value of the fourth bit information is the second value, determining that the target cell supports a second type, wherein system information broadcasted in a cell of the second type does not comprise the SIB1.

6. A computer readable storage medium, storing a program, wherein when the program is executed by a processor, the steps of the method for determining a networking mode supported by a cell according to claim 1 are performed.

7. The computer readable storage medium according to claim 6, wherein when the program is executed by the processor, the following step is performed:
   when connection setup of the network device and the target cell fails, receiving a second message from the target cell, wherein the second message comprises: information related to a failure cause for the connection setup failure, and the information related to the failure cause is used to indicate that the target cell supports standalone networking.

8. The computer readable storage medium according to claim 6, wherein when the program is executed by the processor, the following step is performed:
   when connection setup of the network device and the target cell fails, skipping responding to the connection setup request, and notifying that the target cell supports standalone networking; or
   when connection setup of the network device and the target cell fails, skipping responding to the connection setup request.

9. The computer readable storage medium according to claim 6, wherein the second indication information comprises: third bit information and/or fourth bit information; and
   the third bit information is used to indicate whether the target cell supports standalone networking, and the fourth bit information is used to indicate whether the target cell supports non-standalone networking; or
   or the third bit information is used to indicate whether the target cell supports non-standalone networking, and the fourth bit information is used to indicate whether the target cell supports standalone networking.

10. A method for determining a networking mode supported by a cell, applied to a terminal device and comprising:
sending SIB1-related information of a target cell to a network device, so that the network device sends a connection setup request to the target cell; and when connection setup of the network device and the target cell fails, the network device determines that the target cell supports standalone networking;
or
sending SIB1-related information of a target cell to a network device, so that the network device sends a connection setup request to the target cell; the network device receives, from the target cell, a first message responding to the connection setup request, wherein the first message comprises second indication information, and the second indication information is used to indicate a networking mode supported by the target cell; and the network device determines, according to the second indication information, the networking mode supported by the target cell.

11. The method according to claim 10, wherein the second indication information comprises: third bit information and/or fourth bit information; and
the third bit information is used to indicate whether the target cell supports standalone networking, and the fourth bit information is used to indicate whether the target cell supports non-standalone networking; or
or
the third bit information is used to indicate whether the target cell supports non-standalone networking, and the fourth bit information is used to indicate whether the target cell supports standalone networking.

12. The method according to claim 11, wherein
when a value of the third bit information is a first value, and/or a value of the fourth bit information is a second value, it indicates that the target cell supports standalone networking;
when a value of the third bit information is a second value, and/or a value of the fourth bit information is a first value, it indicates that the target cell supports non-standalone networking;
when a value of the third bit information is a first value, and a value of the fourth bit information is the first value, it indicates that the target cell supports non-standalone networking and standalone networking; or
when a value of the third bit information is a second value, and a value of the fourth bit information is the second value, it indicates that the target cell supports a second type, wherein system information broadcasted in a cell of the second type does not comprise the SIB1.

13. A terminal device, comprising: a processor, a memory, and a program that is stored in the memory and capable of running on the processor, wherein the program, when executed by the processor, implements steps of the method for determining a networking mode supported by a cell according to claim 10.

14. The terminal device according to claim 13, wherein the second indication information comprises: third bit information and/or fourth bit information; and
the third bit information is used to indicate whether the target cell supports standalone networking, and the fourth bit information is used to indicate whether the target cell supports non-standalone networking; or
or
the third bit information is used to indicate whether the target cell supports non-standalone networking, and the fourth bit information is used to indicate whether the target cell supports standalone networking.

15. The terminal device according to claim 14, wherein
when a value of the third bit information is a first value, and/or a value of the fourth bit information is a second value, it indicates that the target cell supports standalone networking;
when a value of the third bit information is a second value, and/or a value of the fourth bit information is a first value, it indicates that the target cell supports non-standalone networking;
when a value of the third bit information is a first value, and a value of the fourth bit information is the first value, it indicates that the target cell supports non-standalone networking and standalone networking; or
when a value of the third bit information is a second value, and a value of the fourth bit information is the second value, it indicates that the target cell supports a second type, wherein system information broadcasted in a cell of the second type does not comprise the SIB1.

16. A network device, comprising: a processor, a memory, and a program that is stored in the memory and capable of running on the processor, wherein the program, when executed by the processor, implements the following steps:
when receiving SIB1-related information sent by a terminal device, sending a connection setup request to a target cell; and
when connection setup of the network device and the target cell fails, determining that the target cell supports standalone networking; or
receiving, from the target cell, a first message responding to the connection setup request, wherein the first message comprises second indication information, and the second indication information is used to indicate a networking mode supported by the target cell; and
determining, according to the second indication information, the networking mode supported by the target cell.

17. The network device according to claim 16, wherein the program, when executed by the processor, further implements the following step:
when connection setup of the network device and the target cell fails, receiving a second message from the target cell, wherein the second message comprises: information related to a failure cause for the connection setup failure, and the information related to the failure cause is used to indicate that the target cell supports standalone networking.

18. The network device according to claim 16, wherein the program, when executed by the processor, further implements the following step:
when connection setup of the network device and the target cell fails, skipping responding to the connection setup request, and notifying that the target cell supports standalone networking; or
when connection setup of the network device and the target cell fails, skipping responding to the connection setup request.

19. The network device according to claim 16, wherein the second indication information comprises: third bit information and/or fourth bit information; and
the third bit information is used to indicate whether the target cell supports standalone networking, and the fourth bit information is used to indicate whether the target cell supports non-standalone networking; or or the third bit information is used to indicate whether the target cell supports non-standalone networking, and the fourth bit information is used to indicate whether the target cell supports standalone networking.

20. The network device according to claim 19, wherein the determining, according to the second indication information, the networking mode supported by the target cell comprises at least any one of the following:

when a value of the first bit information is a first value, and/or a value of the second bit information is a second value, determining that the target cell supports standalone networking;

when a value of the third bit information is a second value, and/or a value of the fourth bit information is a first value, determining that the target cell supports non-standalone networking;

when a value of the first bit information is a first value, and a value of the second bit information is the first value, determining that the target cell supports non-standalone networking and standalone networking; or when a value of the third bit information is a second value, and a value of the fourth bit information is the second value, determining that the target cell supports a second type, wherein system information broadcasted in a cell of the second type does not comprise the SIB1.

* * * * *